Dec. 25, 1923.
E. R. HARDAKER
MEASURING DEVICE
Filed Sept. 22, 1922
1,478,954
2 Sheets-Sheet 1
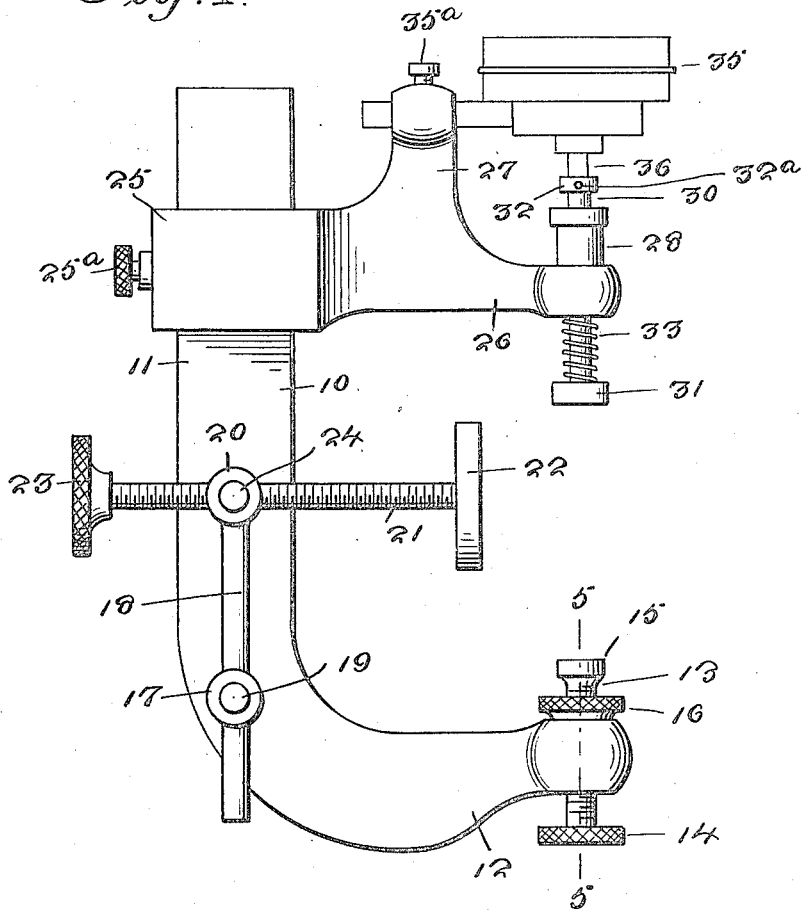
Fig. 1.
Fig. 2.
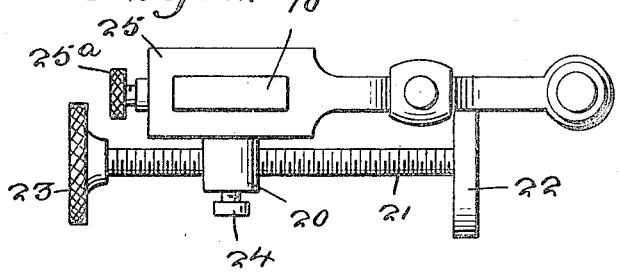
E. R. Hardaker
INVENTOR
BY Victor J. Evans
ATTORNEY Dec. 25, 1923.  
E. R. HARDAKER  
MEASURING DEVICE  
Filed Sept. 22, 1922  
1,478,954  
2 Sheets-Sheet 2
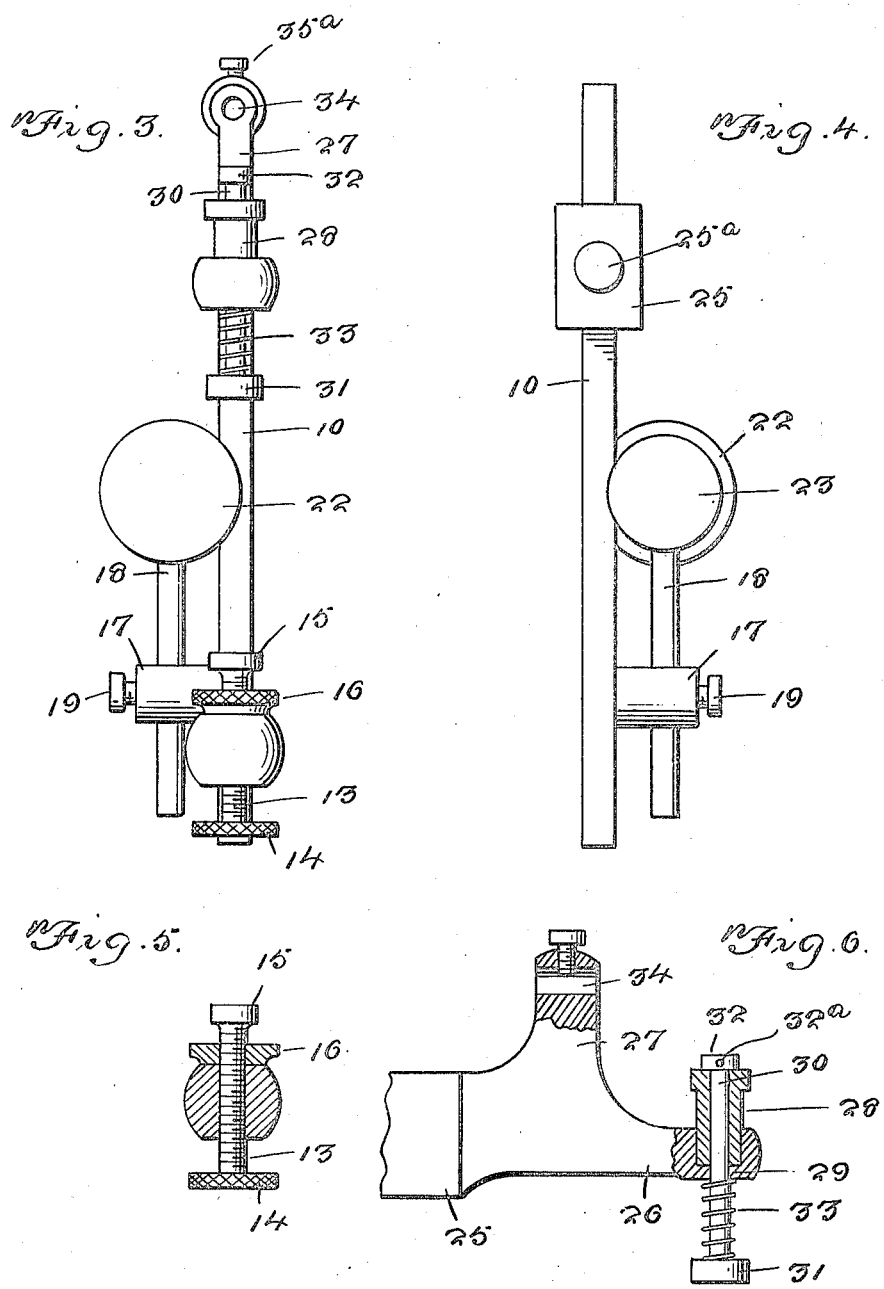
E. R. Hardaker
INVENTOR Patented Dec. 25, 1923.

1,478,954

UNITED STATES PATENT OFFICE.

ERNEST R. HARDAKER, OF JEROME, IDAHO.

MEASURING DEVICE.

Application filed September 22, 1922. Serial No. 589,832.

*To all whom it may concern:*

Be it known that I, ERNEST R. HARDAKER, a citizen of Dominion of Canada, residing at Jerome, in the county of Jerome and State of Idaho, have invented new and useful Improvements in Measuring Devices, of which the following is a specification.

This invention relates to measuring devices, particularly to variometers and has for its object the provision of a novel adjustable supporting device to be used in conjunction with a Starrett indicator for the purpose of facilitating the measurement of very small variations in the diameters of the bearing portions of crank shafts, piston pins, and other similar machine elements, engine parts or the like, the device being naturally adaptable for use for a wide variety of purposes where it is essential to ascertain the exact variations in the dimensions.

An important object is the provision of a device of this character which will be simple and inexpensive in manufacture, easy to operate and adjust, positive and accurate in use, durable in service and a general improvement in the art.

With the above and other objects and advantages in view the invention consists in the details of construction to be hereinafter more fully described and claimed and illustrated in the accompanying drawings, in which:

Figure 1 is a side elevation of the device,
Figure 2 is a plan view,
Figure 3 is a front elevation,
Figure 4 is a rear elevation,
Figure 5 is a section on the line 5—5 of Figure 1,
Figure 6 is an enlarged detail sectional view through the upper portion.

Referring more particularly to the drawings I have shown my device as comprising a supporting frame 10 which is of L-shape and which includes a vertical arm 11 and a horizontal arm 12. The free end of the horizontal arm is formed with a threaded hole through which passes an adjusting screw 13 having its lower end formed with a knurled or milled head 14 and having its upper end carrying a contact 15 having a ground surface. A suitable lock nut 16 is threaded onto this screw for maintaining adjustment.

Extending from one side of the vertical arm 11 is a stud or projection 17 formed with a hole which slidably receives a vertically adjustable rod 18 held in adjusted position by a suitable screw 19. The upper end of this rod 18 is formed with a head 20 having a threaded bore through which is passed a screw 21 having one end carrying a ground disk 22 and having its other end carrying a knurled or milled head 23. A suitable set screw or the like 24 passes through the head 20 and engages the screw 21 for maintaining a selected adjustment.

Slidably mounted upon the upper portion of the vertical arm 11 is a carriage 25 adapted to be held at any desired position by a set screw 25ª and formed with a horizontal extension 26 and a vertical extension 27. Carried by the horizontal extension 26 is a guide tube or sleeve 28 having its bore registering with a hole 29 and through which is slidable a pin 30 having its lower end carrying a ground contact 31 in exact alignment with the contact 15, and having its upper end carrying a collar 32 held in adjusted position by a set screw 32ª. Encircling the pin 30 is a coil spring 33 which is for the purpose of urging the contact 31 downwardly into close engagement with whatever object is disposed between the contacts 15 and 31.

The vertical extension 27 is formed with a bore 34 through which is slidably mounted the shank of a Starrett indicator indicated by the numeral 35, a set screw 35ª being provided for adjusting purposes. The construction of this instrument forms no part of the present invention and the details thereof are not illustrated as they are well known to the art. Suffice it to say that this instrument is for the purpose of measuring variations in dimensions of an object in thousandths of an inch. The numeral 36 designates the operating plunger of this instrument.

In the use of the device the object to be tested, for instance a crank shaft of an engine or the like, is placed between the contacts 15 and 31 and the disk 22, the screw 13 and the screw 21 being adjusted so that the contacts 15 and 31 will engage against exactly diametrically opposite points of the object. This adjustment having once been made the device may be moved along or turned about the crank shaft or other object so that variations in the diameter may be read upon the scale of the instrument 35, or else the device may be stationarily mounted, by any suitable means, and the crank shaft or other object turned so that the variations, if any, may be ascertained. The example of using the device for testing a crank shaft is of course merely an exemplification or illustration of one of the many uses to which the device may be put.

From the foregoing description and a study of the drawings it will be apparent that I have thus provided a simply constructed and consequently inexpensive measuring device which will be highly advantageous and accurate and which will be of incalculable value to mechanics and others in ascertaining whether or not crank shafts, wrist pins, and other machine elements are true or worn out of round. Owing to the simplicity of the construction and the fewness of the parts it is apparent that adjustment is a simple matter and that there is nothing to get out of order so that the device should have a long life.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A device of the character described comprising a supporting member of angular shape, an adjusting screw passing through one arm of said member and carrying a contact head, a slidable member mounted at one side of said support, an adjusting screw carried by said slidable member and carrying a contact head, a carriage slidably mounted upon the other arm of said support and adapted to support an indicator, and a slidable spring pressed contact member carried by the carriage in alignment with said first named contact member and adapted to operatively engage the actuating element of the indicator.

2. A device of the character described comprising a supporting member of angular shape, a contact screw carried by one arm of said supporting member, a carriage slidably mounted upon the other arm of the support and adapted to carry an indicator having an actuating stem, and a spring pressed contact pin carried by the carriage in alignment with said contact screw and adapted to engage the stem of the indicator, a rod slidably adjustably mounted at one side of the support, and a contact screw adjustably carried by said rod and having a contact head, said last named screw having its axis at right angles to the axes of said first named screw and contact pin.

3. A device of the character described comprising an L-shaped supporting member, an adjusting screw threaded through one arm of said member and carrying a contact head, a carriage slidably mounted upon the other arm of said member and formed with angularly disposed extensions, one extension being formed with a bore for adjustably receiving the supporting shank of an indicator having a stem, and a spring pressed contact pin slidable through the other angular extension in alignment with said contact screw and carrying a head engageable by the stem of the indicator and further carrying an article engaging contact.

4. A device of the character described comprising an L-shaped supporting member, an adjusting screw threaded through one arm of said member and carrying a contact head, a carriage slidably mounted upon the other arm of said member and formed with angularly disposed extensions, one extension being formed with a bore for adjustably receiving the supporting shank of an indicator having a stem, and a spring pressed contact pin slidable through the other angular extension in alignment with said contact screw and carrying a head engageable by the stem of the indicator and further carrying an article engaging contact, a supporting rod slidably adjustably mounted longitudinally of the second mentioned arm of the supporting member, and an adjusting screw carried by said rod and having a contact head.

In testimony whereof I affix my signature.

ERNEST R. HARDAKER.